No. 809,698. PATENTED JAN. 9, 1906.
W. V. D. KELLEY.
DISPLAY MIRROR.
APPLICATION FILED APR. 7, 1905.

Witnesses
Geo. A. Hoffman
Geo. W. Kerr

Inventor
William V. D. Kelley
By his Attorney
Julian S. Wooster

UNITED STATES PATENT OFFICE.

WILLIAM V. D. KELLEY, OF NEWARK, NEW JERSEY, ASSIGNOR OF ONE-HALF TO HOWARD S. JONES, OF BROOKLYN, NEW YORK.

DISPLAY-MIRROR.

No. 809,698.

Specification of Letters Patent.

Patented Jan. 9, 1906.

Application filed April 7, 1905. Serial No. 254,334.

*To all whom it may concern:*

Be it known that I, WILLIAM V. D. KELLEY, a citizen of the United States, residing at Newark, in the county of Essex and State of New Jersey, have invented certain new and useful Improvements in Display-Mirrors, of which the following is a full, clear, and exact specification.

This invention relates to display-mirrors, and particularly relates to mirrors which can be lighted from behind to display a sign or picture, but which under ordinary circumstances are opaque and only reflect light from in front.

It has been heretofore proposed to use transparent mirrors in connection with signs or pictures disposed in the rear thereof; but the mirror in order to be transparent could only be thinly silvered and the silver protected with a thin coat of transparent varnish. Such so-called "mirrors" are, in fact, only partial mirrors, since even with the picture not illuminated from behind the mirror sufficient light from the front would be reflected back through the mirror to render the outlines of the picture distinguishable, thus interfering with the effectiveness of the mirror as such when not illuminated. Another objection to such mirrors is that the necessarily thin and delicate varnish does not protect the silver from abrasion, heat, water, atmosphere, &c., and in many instances has been cracked by the heat from the lamps used to illuminate the picture or sign, thus causing rapid deterioration.

According to this invention I propose to provide a mirror having such a backing that it ordinarily forms a complete reflector and a sign or picture in the rear does not become visible through the mirror until lighted from behind.

Another object of the invention is to provide, in addition to the silvered coating, a protective coating which will be impervious to moisture, heat, and other destructive agencies, thus prolonging the life of the mirror.

The invention will be fully understoood in connection with the accompanying drawings, in which—

Figure 1:
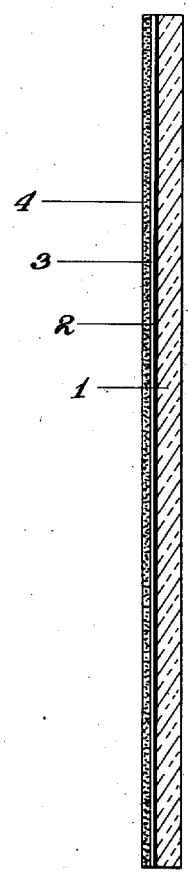
Figure 2:
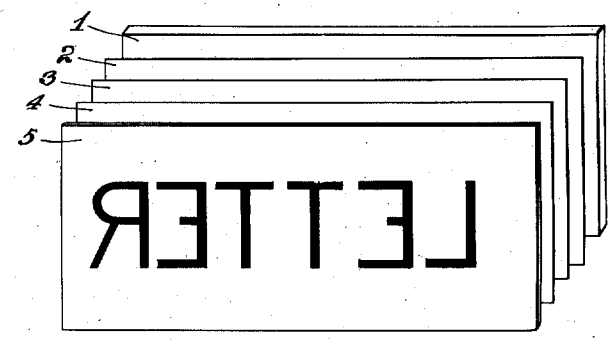

Figure 1 is a section, on an enlarged scale, of my improved mirror. Fig. 2 is a perspective view of an advertising-sign embodying my invention.

1 represents a sheet of glass having a thin silvered coating 2 of well-known nature, which is under ordinary conditions semitransparent and which permits objects back of it to be seen more or less distinctly from in front even when not illuminated, except by reflected light from in front. 3 is a coating of thin transparent varnish or collodion, which is intended to protect the silver. Such a mirror as this is well known in commerce and has been used largely in connection with advertising devices comprising a transparency which could be illuminated and exhibited through the mirror and when not illuminated was faintly distinguishable through the mirror. Such devices in order to fully secure their object should completely obscure the transparency when not illuminated; but this has not heretofore been accomplished in any devices with which I am familiar. Another serious objection to such mirrors is that they cannot be touched without injury to the back and are subject to deterioration from moisture, heat, and atmospheric influences.

In order to provide a mirror which shall completely obscure the transparency when not illuminated, but which will permit the transparency to be seen when illuminated from behind, I provide a coating 4, composed of an oil-paint containing a pigment of any desired color and applied so as to form a stippled surface. This stippled coating is applied with a suitable brush, preferably while the varnish coating is wet, and thus the two coats closely adhere. The paint is waterproof and quickly dries, effectually protecting the varnish and silver against abrasion, as its surface becomes hard instead of being soft and easily scratched, like the thin varnish and silver coatings, if unprotected.

5 represents a transparency having a sign or picture thereon in contrasting colors and is placed close to the back of the mirror. Different color effects may be produced by varying the color of the pigment used in the protecting-coating and also by varying the color of the transparency, the coating in all cases being applied so that it permits transmitted light to pass through from behind, but prevents light from in front passing through and then being reflected out again by the transparency, as happens where the so-called "transparent mirror" is used.

Instead of using a stippled pigment coating I may apply to the varnish while wet a layer of thin specially-prepared paper or cloth which will have a surface similar to the stippled pigment surface and be colored as desired. If cloth or paper be used, it will preferably be first coated with thin varnish to fill up the pores and then applied while wet to the wet varnish on the back of the silver. The cloth or paper is thus rendered waterproof by the varnish and also protects the silver against abrasion, heat, and atmosphere in the same manner as the stippled coating does.

Such a mirror as I have described herein not being "transparent," in the usual acceptance of the term in this art, is especially adapted for use in connection with advertising devices and has been designed for such use more particularly; but it is also useful for general display purposes, as in theaters, &c.

Having thus described my invention, I declare that what I claim as new, and desire to secure by Letters Patent, is—

1. A display-mirror comprising a glass plate, a transparent silvered coating on one side thereof, a transparent varnish over said silvered coating, and a translucent coating for said varnish, substantially as described.

2. A display-mirror comprising a glass plate, a transparent silvered coating on one side thereof, a transparent varnish over said silvered coating, and a protected light-transmitting coating over said varnish, said protective coating having a surface not easily scratched, substantially as described.

3. A display-mirror comprising a glass plate, a transparent silvered coating on one side thereof, a transparent varnish over said silvered coating, and a protective light-transmitting colored coating over said varnish, substantially as described.

4. A display-mirror comprising a glass plate, a transparent silvered coating on one side thereof, a transparent varnish over said silvered coating, and a coating for said varnish, said coating comprising a pigment paint, adapted to transmit light, substantially as described.

5. The process of forming a display-mirror consisting in thinly silvering a glass plate, applying a transparent varnish thereto, and applying to said varnish a translucent coating, substantially as described.

6. The process of forming a display-mirror consisting in thinly silvering a glass plate, applying a transparent varnish thereto, and applying to said varnish while wet a translucent coating, substantially as described.

7. A display-mirror comprising a glass plate, a transparent silvered coating on one side thereof, a transparent varnish over said silvered coating, and a coating over said varnish whereby reflection from an object behind the mirror is prevented, substantially as described.

8. A display-mirror comprising a glass plate, a silvered coating on one side thereof, a pigment coating over said silvered coating adapted to transmit light, substantially as described.

In testimony whereof I affix my signature in presence of two witnesses.

WILLIAM V. D. KELLEY.

Witnesses:
GEO. A. HOFFMAN,
GEO. M. KERR.

---

*Corrections in Letters Patent No. 809,698.*

It is hereby certified that in Letters Patent No. 809,698, granted January 9, 1906, upon the application of William V. D. Kelley, of Newark, New Jersey, for an improvement in "Display-Mirrors," errors appear in the printed specification requiring correction, as follows: On page 1, line 58, the comma after the word "illuminated" should be stricken out, and on page 2, line 30, the word "protected" should read *protective;* and that the said Letters Patent should be read with these corrections therein that the same may conform to the record of the case in the Patent Office.

Signed and sealed this 23d day of January, A. D., 1906.

[SEAL.]

F. I. ALLEN,
*Commissioner of Patents.* which will have a surface similar to the stippled pigment surface and be colored as desired. If cloth or paper be used, it will preferably be first coated with thin varnish to fill up the pores and then applied while wet to the wet varnish on the back of the silver. The cloth or paper is thus rendered waterproof by the varnish and also protects the silver against abrasion, heat, and atmosphere in the same manner as the stippled coating does.

Such a mirror as I have described herein not being "transparent," in the usual acceptance of the term in this art, is especially adapted for use in connection with advertising devices and has been designed for such use more particularly; but it is also useful for general display purposes, as in theaters, &c.

Having thus described my invention, I declare that what I claim as new, and desire to secure by Letters Patent, is—

1. A display-mirror comprising a glass plate, a transparent silvered coating on one side thereof, a transparent varnish over said silvered coating, and a translucent coating for said varnish, substantially as described.

2. A display-mirror comprising a glass plate, a transparent silvered coating on one side thereof, a transparent varnish over said silvered coating, and a protected light-transmitting coating over said varnish, said protective coating having a surface not easily scratched, substantially as described.

3. A display-mirror comprising a glass plate, a transparent silvered coating on one side thereof, a transparent varnish over said silvered coating, and a protective light-transmitting colored coating over said varnish, substantially as described.

4. A display-mirror comprising a glass plate, a transparent silvered coating on one side thereof, a transparent varnish over said silvered coating, and a coating for said varnish, said coating comprising a pigment paint, adapted to transmit light, substantially as described.

5. The process of forming a display-mirror consisting in thinly silvering a glass plate, applying a transparent varnish thereto, and applying to said varnish a translucent coating, substantially as described.

6. The process of forming a display-mirror consisting in thinly silvering a glass plate, applying a transparent varnish thereto, and applying to said varnish while wet a translucent coating, substantially as described.

7. A display-mirror comprising a glass plate, a transparent silvered coating on one side thereof, a transparent varnish over said silvered coating, and a coating over said varnish whereby reflection from an object behind the mirror is prevented, substantially as described.

8. A display-mirror comprising a glass plate, a silvered coating on one side thereof, a pigment coating over said silvered coating adapted to transmit light, substantially as described.

In testimony whereof I affix my signature in presence of two witnesses.

WILLIAM V. D. KELLEY.

Witnesses:
GEO. A. HOFFMAN,
GEO. M. KERR.

---

It is hereby certified that in Letters Patent No. 809,698, granted January 9, 1906, upon the application of William V. D. Kelley, of Newark, New Jersey, for an improvement in "Display-Mirrors," errors appear in the printed specification requiring correction, as follows: On page 1, line 58, the comma after the word "illuminated" should be stricken out, and on page 2, line 30, the word "protected" should read *protective;* and that the said Letters Patent should be read with these corrections therein that the same may conform to the record of the case in the Patent Office.

Signed and sealed this 23d day of January, A. D., 1906.

[SEAL.]

F. I. ALLEN,
*Commissioner of Patents.*

Corrections in Letters Patent No. 809,698.

It is hereby certified that in Letters Patent No. 809,698, granted January 9, 1906, upon the application of William V. D. Kelley, of Newark, New Jersey, for an improvement in "Display-Mirrors," errors appear in the printed specification requiring correction, as follows: On page 1, line 58, the comma after the word "illuminated" should be stricken out, and on page 2, line 30, the word "protected" should read *protective;* and that the said Letters Patent should be read with these corrections therein that the same may conform to the record of the case in the Patent Office.

Signed and sealed this 23d day of January, A. D., 1906.

[SEAL.]

F. I. ALLEN,
*Commissioner of Patents.*